(No Model.) 3 Sheets—Sheet 1.
J. MONTO.
MACHINE FOR REGULATING THE COATING OF ONE METAL WITH ANOTHER.
No. 421,597. Patented Feb. 18, 1890.
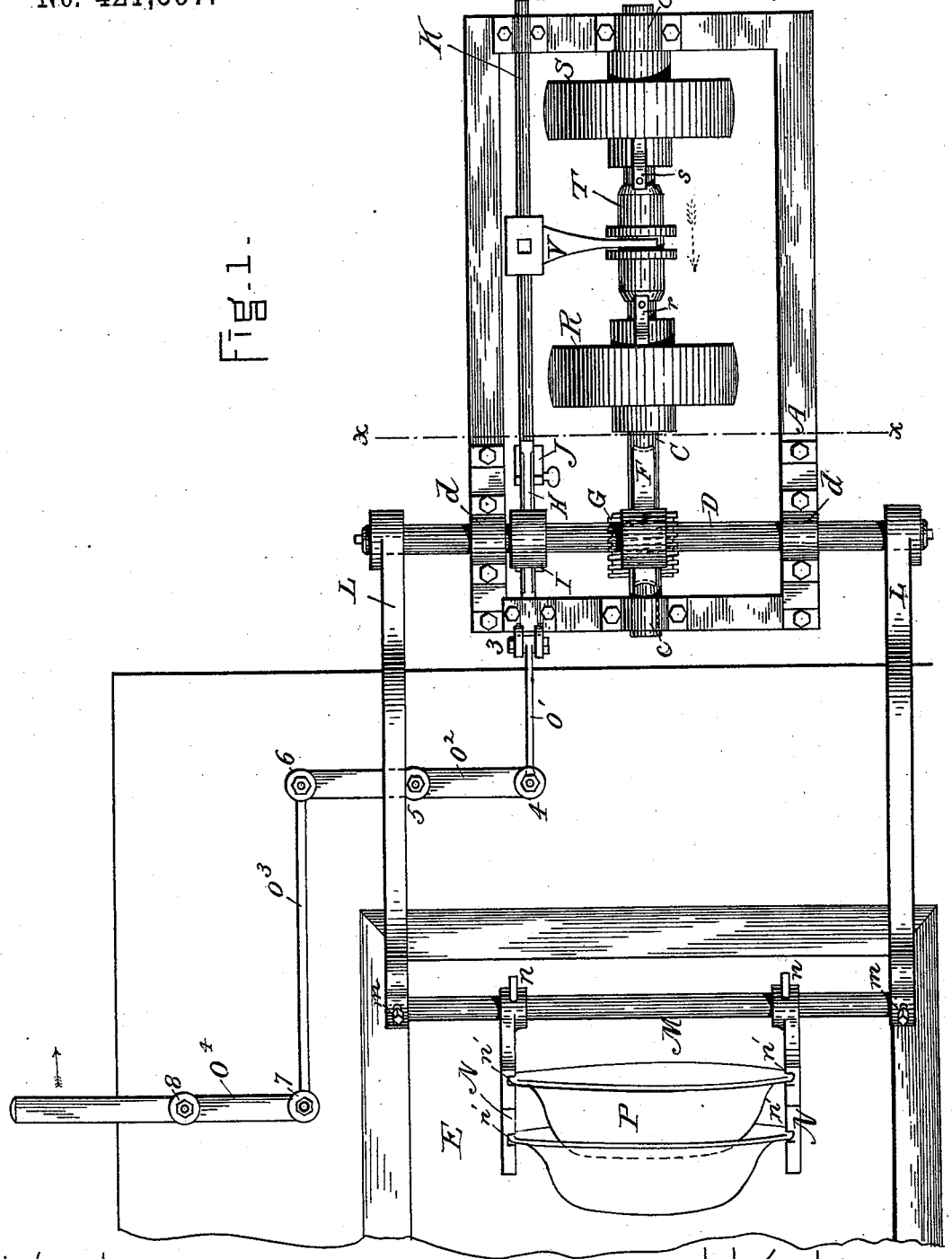
WITNESSES.
INVENTOR.

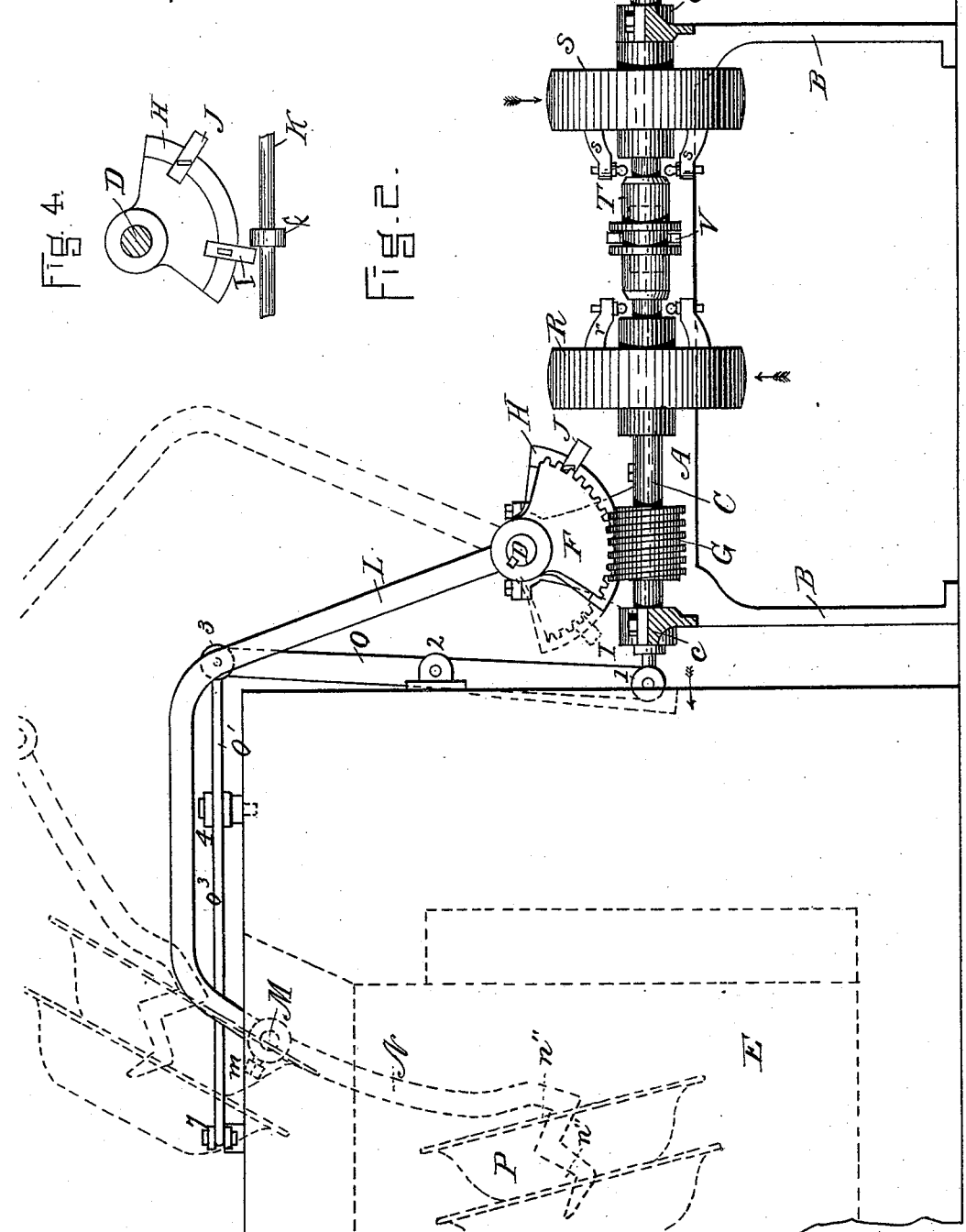

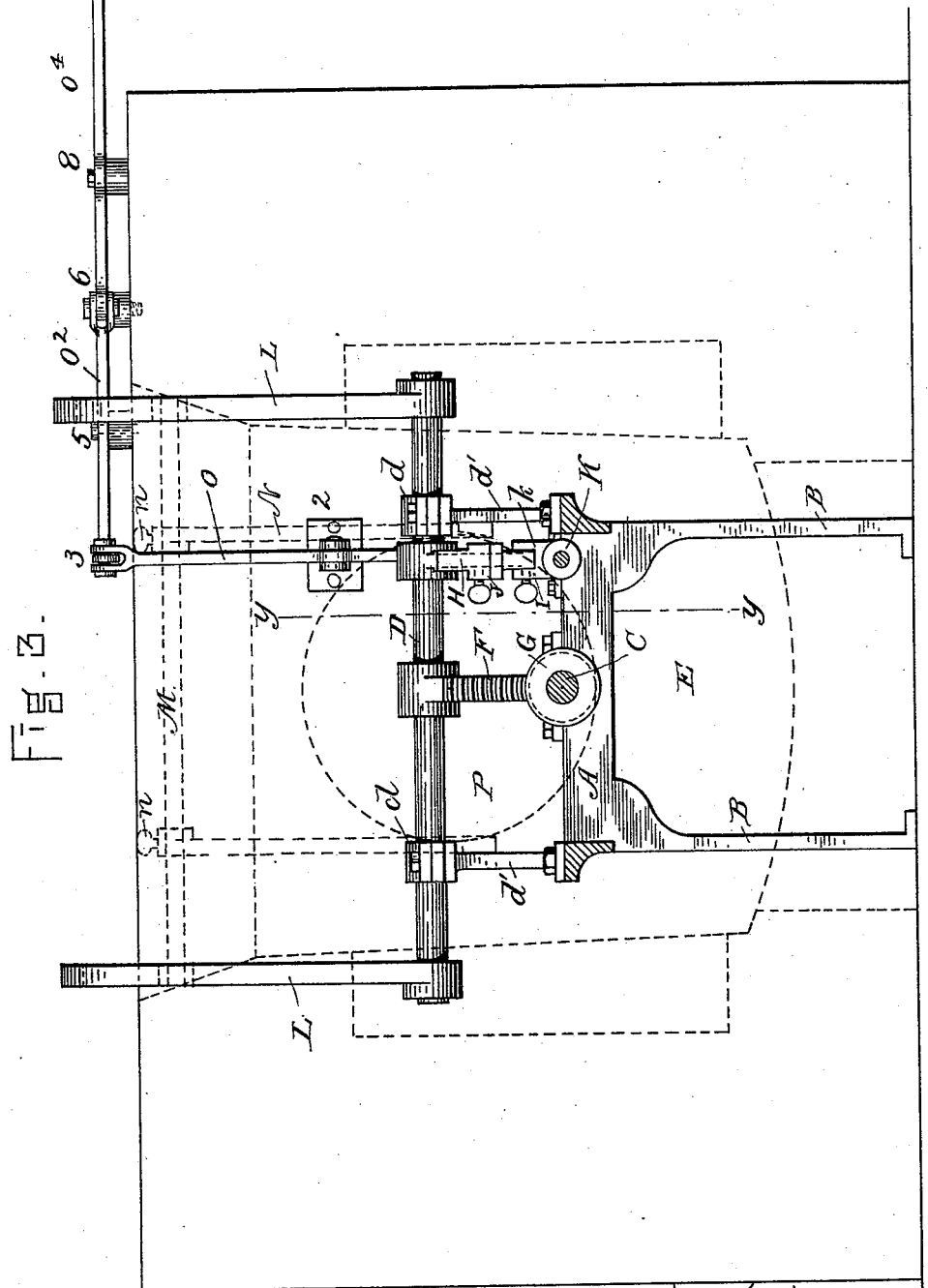

UNITED STATES PATENT OFFICE.

JOSEPH MONTO, OF CHELSEA, MASSACHUSETTS, ASSIGNOR, BY MESNE ASSIGNMENTS, TO THE STEEL EDGE STAMPING AND RETINNING COMPANY, OF PORTLAND, MAINE.

MACHINE FOR REGULATING THE COATING OF ONE METAL WITH ANOTHER.

SPECIFICATION forming part of Letters Patent No. 421,597, dated February 18, 1890.

Application filed February 23, 1889. Serial No. 300,863. (No model.)

*To all whom it may concern:*

Be it known that I, JOSEPH MONTO, of Chelsea, in the county of Suffolk and State of Massachusetts, have inventd certain new and useful Improvements in Machines for Regulating the Coating of one Metal with Another, of which the following is a specification.

This invention relates to machines for regulating the coating of one metal with another, immersing and holding articles first in a bath of melted tin and then in a bath of hot grease.

The general process of retinning pans, to which this invention is applied, is described in Letters Patent of the United States No. 372,555, granted to me November 1, 1887, as follows: "For the purpose of retinning pans it is customary to use a series of four pots arranged in a row and provided with a furnace or means of heating each, the first and third pots being for holding the grease, while in the second or intermediate and in the fourth pot is the tin. The last or fourth pot is smaller than either of the others, it being what is termed the 'list-pot,' which is charged with the metal, and is to remove from the pan the 'list' or drip or small surplus metal that may adhere to and protrude from the lower edge of the pan. The pan is first introduced into the bath of grease of the first pot for about one-half a minute, after which the pan is immersed in the molten tin in the next pot, and after withdrawal from it the pan is submerged in the third pot or bath of grease, which will remove the surplus of the coating of tin, the amount removed being determined by the length of time of immersion, the finish being due to the speed with which the pan is removed from the grease bath. Finally, the lower part of the pan is dipped into the last pot in order that the hot charge may remove the drip or surplus of tin that may adhere to the lower edge of the pan. Next the pan has the grease on it removed from it by sawdust and flour or other suitable means." In the withdrawal of the articles from the second grease-pot the speed must be carefully regulated to insure a coating of the desired weight and even distribution, and the direction of the movement should be such as to give the articles a tipping motion while they are rising, such motion giving an improved result, as described in my former patent.

My present invention has for its object to provide simple and effective mechanism for immersing the articles in and withdrawing them from the second grease-pot; and it consists in the improvements which I will now proceed to describe and claim.

In the following drawings, forming a part of this specification, Figure 1 represents a top view of my improved machine and a portion of the second grease-pot. Fig. 2 represents a side elevation of machine and pot. Fig. 3 represents a sectional end view along line $x\ x$ of Fig. 1, the pot and parts within being shown in dotted lines. Fig. 4 represents a sectional view along line $y\ y$ of Fig. 3.

The same letters of reference indicate the same parts in all the figures.

In the drawings, A represents the frame of the machine, supported by standards B, which rest on the floor at the side or end of the grease-pot E. The driving-shaft C is journaled in bearings $c\ c$ on the frame, and has a worm G, meshing with a worm-gear or segment of a worm-wheel F on the rock-shaft D, and thereby communicates motion to the rock-shaft. Said rock-shaft is journaled in bearings $d\ d$, raised on supports $d'\ d'$, seated on the frame A.

Bent arms L L are connected to the rock-shaft D by collars and keys and extend upwardly and over the pot, where their ends are connected to the cross-rod M by set-screws $m$. To the said cross-rod are adjustably connected by collars and thumb-screws $n$ the sustaining-arms N, which in this case support the basins P. The sustaining-arms N have their ends bent so as to be substantially horizontal, and each has two graduated grooves $n'$, Fig. 1, on its inner side to receive the edges of two pans, which are guided into the grooves by the notches $n''\ n''$, Fig. 2. The said grooves are deeper at their upper than at their lower ends, so that while they will receive the pans they will not allow them to pass through.

Any other suitable devices may be used to hold the pans to the sustaining-arms without departing from the spirit of my invention. The sustaining-arms, being adjustably secured to the cross-rod, may be set at any desired distance from each other, so that articles of different sizes may be inserted and held.

The driving-shaft is provided with two friction-pulleys R and S, which, loose on the shaft, are revolved in opposite directions, as indicated by arrows in Fig. 2, by belts from a suitable motor, one of said belts being crossed and the other open or not crossed. Each of the said pulleys is provided with a friction mechanism for engaging it with the shaft, and there is applied to the shaft between the pulleys a slide or sleeve T to operate said friction mechanism when it is desired to clutch either of said pulleys to the shaft. Any suitable friction mechanism may be used. In this case each pulley has two right angular levers $r$ $r$ and $s$ $s$. The inner ends of said levers (not shown) are formed to grasp the shaft and act like brakes thereon whenever the outer arms are forced apart by the sleeve T. To the pulleys are fixed springs, which bear on the levers and tend to force the inner ends out of contact with the shaft. This friction mechanism is shown in Fig. 13 of the drawings of the above-mentioned patent; but, as above indicated, I do not limit myself thereto, but may employ any other suitable friction-clutch.

The sleeve T is engaged with the fork V, which is attached to the rod K. Said rod is movable longitudinally in bearings on frame A, and is arranged to be moved automatically, and also by hand through the connecting levers and rods O O' $O^2$ $O^3$ $O^4$. The lever O centrally pivoted at 2 and connected with the rod K at 1. The rod O' connects the levers O and $O^2$, being pivotally attached to the same at their ends 3 and 4. The lever $O^2$ is centrally pivoted at 5 and pivotally connected to the rod $O^3$ at its end 6, the rod $O^3$ being also pivotally connected to the end 7 of the third lever $O^4$. The lever $O^4$ is centrally pivoted at 8, and has its outer free end formed to be grasped by the hand in moving the rod K through said rods and levers. A flanged segment H is connected by a collar to the shaft D just above the rod K. On the edge of the segment H are secured two dogs I and J by thumb-screws $i$ and $j$, which dogs are arranged to engage with a collar $k$ on the rod K when the rock-shaft is in motion, as hereinafter described. The said dogs, being grooved to receive the edge of the segment and secured thereto by thumb-screws, may be placed at any point on the edge of the segment, and thus be arranged to engage with the collar $k$ at any desired stage of the operation.

I will now proceed to describe the operation of the above-described mechanism in submitting the pans or other articles to the action of the second grease bath.

I will suppose that two pans have just been raised from the bath by the machine. These are removed by the attendant and two more from the tin-pot placed in the grooves of the sustaining-arms N N. The attendant then moves the lever $O^4$ in the direction indicated by the arrow in Fig. 1, and the motion is communicated by the series of rods and levers $O^4$ $O^3$, &c., to the rod K, giving it a motion in the direction required to move the sleeve T between the clutch-arms $r$ $r$ of the pulley R. The shaft C, being thus engaged with the pulley R, is rotated with the connected worm G in the same direction as the said pulley, and by the worm-segment F this motion is so communicated to the rock-shaft D as to depress the connected bent arms L and lower the pans into the bath. By this movement of the rock-shaft D the dog-bearing segment H is moved toward the position shown Fig. 4, and the dog I comes into contact with the collar $k$ on the rod K just as the pans reach their lowest position, thus forcing the said rod and its connected fork V toward the pulley S. The movement of the said fork forces the sleeve T out of engagement with the friction mechanism of pulley R and into engagement with that of pulley S. The shaft C, being now engaged with the pulley S, is rotated with said pulley in the direction opposite to its former movement. This movement is communicated by the gearing to the rock-shaft D, and thereby raises the bent arms L and connected pans and frees the dog $i$ from contact with the collar $k$. When this motion of the rock-shaft has raised the pans to the highest point, the dog J comes in contact with collar $k$, and the sleeve T is thereby forced out of engagement with pulley S. The rate of rotation of pulley S is less than that of pulley R, and the momentum imparted by it to the moving parts is only sufficient to move the clutch-operating collar T out of engagement with the clutch devices of pulley S, and will not move said collar T into engagement with the clutch devices of pulley R, the additional movement effected by the hand-operated levers $O^4$, $O^3$, $O^2$, O', and O being required to engage the sleeve T with the clutch devices of pulley R, and thus start the machine, as stated at the commencement of the description of the operation.

The cross-rod M may be turned in the collars on the ends of the bent arms L and secured by the screws $m$ $m$, thus enabling the sustaining-arms N to be fixed in any desired position relative to the bent arms L. They may thus be so regulated as to hold the pans when they rise from the bath in a position which will allow the greatest possible freedom for the tin and grease to flow from the pan, this end being also secured through the tipping movement given the pans as they are raised.

It will be observed that the rock-shaft D is the center on which the carrying-arms N N move, so that said arms and the articles carried thereby move in the arc of a circle. It will also be observed that the shaft D is below the top of the grease-pot, so that the articles which are inserted in the arms N N enter and leave the hot grease edgewise in a nearly vertical direction, are tipped or caused to assume different inclinations as they rise, this motion having the effect to uniformly spread the coating on the article, and prevent any undue accumulation of the coating on the lower edge of the article. The pulley S that causes the upward motion of the articles is rotated at a slower rate than the pulley R by a suitable arrangement of pulleys on the counter-shaft that gives motion to the belts actuating the pulleys R S, so that the withdrawal of the articles from the grease is slower than their immersion.

I claim—

1. In a machine for regulating the coating of one metal with another, the combination of a pot or receptacle for hot grease, a rock-shaft located below the top of said pot or receptacle outside of the same, arms attached to said shaft and bent to extend upwardly therefrom over one edge of the pot and downwardly into the latter, said arms having holding devices at their ends formed to hold the edges of sheet-metal articles, and mechanism for oscillating said shaft and its arms, and thereby tipping or varying the inclination of the articles held by said arms, the location of the rock-shaft below the top of the pot enabling the articles to move in a nearly vertical direction in the grease, and to be at the same time tipped or tilted, as set forth.

2. In a machine for regulating the coating of one metal with another, the combination of a rock-shaft located below the top of a pot or receptacle, bent arms attached to said shaft and formed to extend over one edge of the pot and into the latter, a shaft C, having a worm meshing with a worm-segment on said rock-shaft, two loose pulleys rotated in opposite directions on the shaft C and provided with clutch devices whereby they may be engaged with said shaft, and a rod reciprocated by the movements of the rock-shaft and provided with an operating device whereby said pulleys may be alternately engaged with the shaft C, as set forth.

3. The combination of the rock-shaft having the bent arms N N, the gear-segment F, and the dogs I J, the shaft C, having the worm meshing with the segment F, the loose pulleys R S on the shaft, provided with clutch devices, the sliding collar whereby said clutch devices may be made operative alternately, and the longitudinally-movable rod K, connected with said collar, and provided with a projection k, arranged between the vibrating dogs I J, whereby said dogs are caused to reciprocate the rod, as set forth.

4. The combination of the rock-shaft having the bent arms N N, the gear-segment F, and the dogs I J, the shaft C, having the worm meshing with the segment F, the loose pulleys R S on the shaft, provided with clutch devices, the sliding collar whereby said clutch devices may be made operative alternately, and the longitudinally-movable rod K, connected with said collar, and provided with a projection k, arranged between the vibrating dogs I J, whereby said dogs are caused to reciprocate the rod, and hand-operated devices whereby the rod K may be moved to throw the said collar into engagement with the clutch of the other pulley to set the arms N N in motion, as set forth.

In testimony whereof I have signed my name to this specification, in the presence of two subscribing witnesses, this 13th day of February, A. D. 1889.

JOSEPH MONTO.

Witnesses:
C. F. BROWN,
A. D. HARRISON.